United States Patent [19]
Panitz et al.

[11] 3,888,986
[45] June 10, 1975

[54] CERTAIN 1-(5-NITRO-2-THIENYL)-1-ACYLAMIDOALKANES FOR TREATING HISTOMONIASIS

[75] Inventors: Eric Panitz, Hamilton Square; Peter J. L. Daniels, Cedar Groove, both of N.J.

[73] Assignee: Schering Corporation, Kenilworth, N.J.

[22] Filed: Jan. 28, 1974

[21] Appl. No.: 437,409

[52] U.S. Cl. ............................................... 424/275
[51] Int. Cl. ............................................ A61k 27/00
[58] Field of Search .................................... 424/275

[56] References Cited
UNITED STATES PATENTS

| | | | |
|---|---|---|---|
| 3,479,343 | 11/1969 | Johnston | 424/275 |
| 3,639,613 | 2/1972 | Dunn et al. | 424/275 |

OTHER PUBLICATIONS

Bellenghi et al., Gazz. Chim. Ital. (1952), 82, 773–807.

*Primary Examiner*—V. D. Turner
*Attorney, Agent, or Firm*—Arthur E. Wilfond; Bruce M. Eisen; Stephen B. Coan

[57] ABSTRACT

Histomoniasis (turkey blackhead) is treated with certain 1-(5-nitro-2-thienyl)-1-acylamidoalkanes.

5 Claims, No Drawings

CERTAIN 1-(5-NITRO-2-THIENYL)-1-ACYLAMIDOALKANES FOR TREATING HISTOMONIASIS

The present invention relates to new methods for the prevention and control of histomoniasis, which is also known as enterohepatitis, or turkey blackhead.

In its composition aspect, the present invention relates to a poultry feed composition adapted to inhibit histomoniasis comprising a poultry feed having admixed therewith a thiophene of the formula:

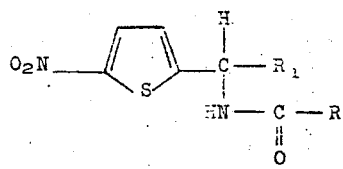

wherein R is an alkyl group having 1 to 6 carbon atoms, $R_1$ is an alkyl group having 1 to 4 carbon atoms, in an amount sufficient to inhibit histomoniasis in poultry.

In its process of using aspect, the present invention relates to a process for controlling histomoniasis in poultry, particularly turkeys, which comprises orally administering to said poultry an amount sufficient to control histomoniasis in turkeys, of a thiophene of the above formula.

Histomoniasis, which occurs in poultry, particularly in turkeys, is caused by the organism *Histomonas meleagridis*. This organism, which is found in the droppings of turkey and other fowl, is harbored in the eggs of the cecal worm, *Heterakis gallinae*. The blackhead disease is established when the cecal worm is ingested by poultry, particularly chickens and turkeys. The disease may be transmitted artificially in intra-rectal inoculation of infected organs homogenized in physiological saline or by the oral inoculation of infected *Heterakis gallinae* ova. The disease, while affecting chickens and other poultry, such as peafowl, ruffed grouse and quail, is particularly disastrous with respect to turkeys, and spreads extremely rapidly. Since the mortality rate of infected flocks is often 80 percent and above, the disease constitutes a serious economic problem to the turkey grower.

Characteristic symptoms are drowsiness, weakness, drooping wings and tail, a lowered head and a sulfur-colored diarrhea. The economic loss occurs as a result of weight loss, unthriftiness, poor feed utilization, and mortality in the affected poultry.

Synthetic chemicals have been used to prevent such economic loss caused by *Histomonas meleagridis*. Applicants have found that 1-(5-nitro-2-thienyl)-1-acylamidoalkanes prevent the disease and economic losses concomitant therewith. The present invention is based upon the discovery that 1-(5-nitro-2-thienyl)-1-acylamidoalkanes of the formula:

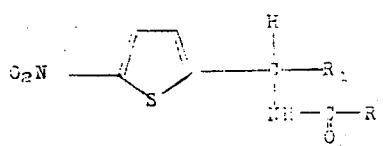

wherein R is alkyl having 1 to 6 carbons, $R_1$ is alkyl having 1 to 4 carbons, when administered orally with normal poultry nutriments or water, are effective in the control of histomoniasis. Particularly effective are 1-(5-nitro-2-thienyl)-1-acetamidoethane and 1-(5-nitro-2-thienyl)-1-isobutyramidoethane.

These compounds may be prepared according to reaction scheme A:

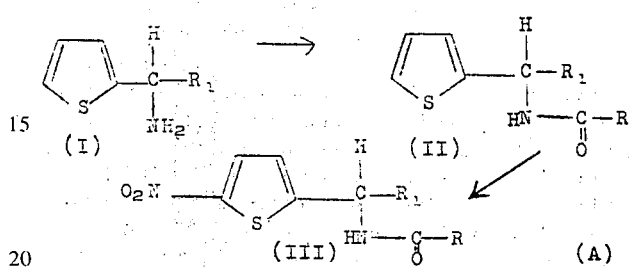

wherein R and $R_1$ have the above meaning.

The compounds of formula II can be prepared as shown by Blicke and Burckhalter 64 J.A.C.S. 477 (1942) by reacting a 1-(2-thienyl)-1-aminoalkane with an acyl halide or acid anhydride.

The compounds of formula III are prepared by nitrating the compounds of formula II as shown in Bellenghi et al, (1952) 82 Gazz. chim. Ital. 773–807, which describes the preparation of 1-(5-nitro-2-thienyl)-1-acetamidoethane and 1-(5-nitro-2-thienyl)-1-acetamidopropane.

As used herein the term "alkyl" includes straight chain or branched-chain radicals having the specified number of carbon atoms as illustrated by methyl, ethyl, isopropyl, methylcyclopropyl, isobutyl, and the like.

The 1-(5-nitro-2-thienyl)-1-acylamidoalkane compounds of the invention are administered orally to the turkeys by being intimately mixed as an element of the turkey feed or suspended in the drinking water. When the infection is particularly severe, the thiophene is preferably added to the drinking water since the birds will continue to drink even after they have stopped eating solid food.

In those cases wherein turkey feed is employed as the vehicle for the thiophene, it is desirable that the drug be mixed uniformly throughout the feed. This is accomplished by preparing a premix or feed supplement wherein the thiophene is present in concentrations of from about 1 percent to about 40 percent by weight, preferably about 10 percent by weight, and where the carrier or diluent is preferably an ingredient of the feed, e.g. corn or cornmeal. Any non-toxic orally ingestible carrier may, of course, be used. These feed supplements are then uniformly mixed throughout the turkey ration by conventional techniques such as milling.

When it is desired to administer the compounds of the invention in the water ration, the thiophene may be suspended by non-toxic surfactants to produce an adequate dosage of active.

An effective dosage will vary for the individual compounds within the invention and for the age and weight of the birds. A dosage rate of 50 to 500 ppm may be advantageously utilized. A dosage rate of 0.0125 percent (125 ppm) 1-(5-nitro-2-thienyl)-1-acetamidoethane in feed fed ad lib generally provides excellent prophylaxis against histomoniasis, although 50 ppm already provides a significant improvement. Although additional active may be added to the feed, it generally provides no additional prophylactic benefits.

The invention will be further described in greater detail hereinbelow with respect to the following illustrative, non-limiting examples.

Example 1 - Preparation of 1-(2-thienyl)-1-propionamidoethane

Add 12.7 g. (0.1 mol) of 1-(2-thienyl)-1-aminoethane and 120 cc. distilled $H_2O$ to a 3 liter flask. Acidify by adding 35.5 cc. of a 10 percent HCl solution (0.1 mol) from a dropping funnel with stirring and cooling over a 10 minute period (temp.=10°–15°C). Add 250 cc. of distilled $H_2O$. Add 52 cc. (0.4 m) propionic anhydride at 0°C. Keep at 1°C for 1 ½ hours. Neutralize by slowly adding with stirring 46.9 grams (0.54 moles) $NaHCO_3$. Store the reaction mixture overnight in a refrigerator. Remove from refrigerator and allow to warm to room temperature. Extract several times with ethyl acetate (EtOAc). Wash the combined extracts with distilled $H_2O$ and dry over $MgSO_4$ for 1 hour. Filter the solution and remove the EtOAc in vacuo. Triturate the residue and wash with cold petroleum ether, to give 1-(2-thienyl)-1-propionamidoethane, melting at 70°–72'C.

Example 2 - 1-(5-nitro-2-thienyl)-1-propionamidoethane

Place 65 cc. of 90 percent nitric acid in a 250 cc. 3-neck round bottom flask equipped with a thermometer and a stirrer. Cool the stirring solution down to −25° to −30°C in an acetonedry ice bath. Add 11.0 g. (0.06m) of 1-(2-thienyl)-1-propionamidoethane portionwise with stirring over a period of approximately 45 minutes so as to keep the temperature at −25° to −30°C. On completion of the amidoethane addition, remove the cold bath and allow the reaction mixture to warm to 15°C, at which time pour it onto 100 cc. icewater and immediately neutralize with solid sodium carbonate so as to obtain a solution of pH8. Extract the solution several times with EtOAc and wash the combined extracts with cold 1:1 $H_2O$: saturated NaCl solution. Dry the organic layer over $MgSO_4$, filter and concentrate to about 100 cc. Refrigerate to effect crystallization. Filter off the solution and triturate the solid with 50 cc. of cold 3:1 hexaneacetone. Filter and dry to yield 10.1 grams (73.75 percent) of cream colored solid 1-(5-nitro-2-thienyl)-1-propionamidoethane, m.p.=64°–66°C.

Example 3 - Preparation of 1-(2-thienyl)-1-isobutyramidoethane

Add 17.72 grams (0.1 mol) of 1-(2-thienyl)-aminoethane and 150 cc. $H_2O$ to a 3 liter flask. Acidify by adding 0.1 mol (35.5 cc. of a 10 percent aqueous solution) HCl solution dropwise with stirring (temp.=−1°C). Slowly add 63.28 gram (0.4 moles) isobutyric anhydride over a period of about ½ hour. Add 55 g. (0.52 mol) $NaHCO_3$ at −1°C over ½ hour. After addition is complete, allow the reaction mixture to warm to room temperature with stirring. Extract twice with 400 cc. EtOAc. Wash the extracts with 200 cc. $H_2O$ and dry over $MgSO_4$. Filter off the solution after 1 hour. Evaporate off the EtOAc. Take up in 200 cc. 10 percent $Na_2CO_3$. Stir for 2 ½ hours and extract with EtOAc. Dry over $MgSO_4$ and remove the solvent to obtain a greenish oil. Stir overnight with 10 percent $Na_2CO_3$. Extract the solution twice with EtOAc, wash the extracts and dry over $MgSO_4$. Filter and remove the solvent to yield an oil which, upon standing in the refrigerator for an hour, crystallizes. Triturate the solid with 80 cc. petroleum ether to yield 17.10 grams (86.75 percent theo) of white solid, 1-(2-thienyl)-1-isobutyramidoethane, m.p.=60°–62°C.

Example 4 - 1-(5-nitro-2-thienyl)-1-isobutyramidoethane

Place 65 cc. of 90 percent nitric acid into a 250 cc. 3-neck round bottom flask equipped with a thermometer and a stirrer. Cool the stirring solution down to −25° to −30°C in an acetonedry ice bath. Add 10.0 g. (0.051 m) of 1-(2-thienyl)-1-isobutyramidoethane portionwise with stirring over a period of approximately 45 minutes so as to keep the temperature at −25° to −30°C. On completion of the amidoethane addition, remove the cold bath and allow the reaction mixture to warm to 15°C, at which time pour it onto 200 grams icewater and immediately neutralize with 80 grams solid sodium carbonate so as to obtain a pH8 solution. Extract the solution thrice with EtOAc and wash the combined extracts with cold 1:1 $H_2O$: saturated NaCl solution. Dry the organic layer over $MgSO_4$, filter and concentrate to about 100 cc. Refrigerate until crystallization is effected. Filter the solution and triturate the solid with 50 cc. of cold 3:1 hexane-acetone. Filter and dry to yield 10.59 grams (85.8 percent) of cream-colored solid, 1-(5-nitro-2-thienyl)-1-isobutyramidoethane, m.p.=106°–108°C.

Analogously, the following may be prepared:
1-(5-nitro-2-thienyl)-1-acetamidopropane
1-(5-nitro-2-thienyl)-1-propionamidopropane
1-(5-nitro-2-thienyl)-1-cyclopropylacetamidopropane
1-(5-nitro-2-thienyl)-1-butyramidobutane
1-(5-nitro-2-thienyl)-1-heptylamidopentane

EXAMPLE 5

250 ppm of 1-(5-nitro-2-thienyl)-1-acetamidoethane as a 10 percent cornmeal premix was admixed with a non-medicated standard turkey starter mash such as:

Turkey Starter Mash (28% protein)

| Ingredient | % | lbs/1400 lb. mix |
|---|---|---|
| Corn | 43.75 | 612.50 |
| Soybean meal | 35.75 | 500.50 |
| Alfalfa meal | 3.75 | 52.50 |
| Fish meal | 5.00 | 70.00 |
| Meat and Bone - ground | 5.00 | 70.00 |
| Corn distiller dry solubles | 2.25 | 31.50 |
| Cottonseed oil | 2.00 | 28.00 |
| Limestone | .25 | 3.50 |
| Defluorinated phosphate | 1.25 | 17.50 |
| Salt | .50 | 7.00 |
| Trace Minerals (Premix formulation*) | .10 | 1.40 |
| WHIT-VIM No. 5 Vitamin mix** | .40 | 5.60 |

*Trace Minerals premix formulation: Manganese, 6.00%; Zinc, 2.00%; Iron, 2.00%; Copper, 0.20%; Iodine, 0.12%; Cobalt, 0.02%; Calcium, 26.28% – 31.28%.

**WHIT-VIM No. 5 is a commercially available vitamin premix containing per lb. of premix: Vitamin A, 1,200,000 USP units; Vitamin $D_3$, 400,000 IC units; Vitamin E, 1,000 I units; Vitamin $B_{12}$ activity, 2.4 mgs; Riboflavin, 1,000 mgs; d-Pantothenic acid (as Calcium d Pantothenate), 1,600 mgs (1740 mgs); Niacin, 8,000 mgs; Choline chloride, 90,000 mgs; Menadione Sodium Bisulfite Complex (Menadione 132 mgs), 400 mgs; Folic acid, 120 mgs; and dl-Methionine, 70.8 grams.

The feed with 1-(5-nitro-2-thienyl)-1-acetamidoethane added thereto was fed ad lib to turkey poultry (Beltsville broad breasted white) at five days of age. Approximately 48 hours after administration of the 1-(5-nitro-2-thienyl)-1-acetamidoethane medicated feed, the poults were infected with 500 ova or 1 cc. of an ova suspension of H. gallinarum ova or 4 cc. of cecal-liver homogenate with organs recovered from a bird infected 12-14 days previously. Results of this test indicate that 1-(5-nitro-2-thienyl)-1-acetamidoethane prevents histomoniasis in the turkeys as evidenced by absence of typical liver and cecal lesions characteristic of histomoniasis. A similar feed containing a 50 ppm reduced the mortallity in the turkeys of another flock.

We claim:

1. A poultry feed composition adapted to inhibit histomoniasis comprising a poultry feed having admixed therewith 1-(5-nitro-2-thienyl)-1-isobutyramidoethane, in an amount sufficient to inhibit histomoniasis in poultry.

2. A process for inhibiting or treating histomoniasis in poultry which comprises orally administering to said poultry an amount, sufficient to inhibit or treat histomoniasis, of a thiophene of the formula:

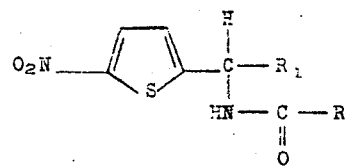

wherein R is alkyl having 1 to 6 carbon atoms, and $R_1$ is alkyl having 1 to 4 carbon atoms.

3. The process of claim 2, wherein said poultry is turkey.

4. The process of claim 3, wherein said thiophene is 1-(5-nitro-2-thienyl)-1-acetamidoethane.

5. The process of claim 3, wherein said thiophene is 1-(5-nitro-2-thienyl)-1-isobutyramidoethane.

* * * * *